United States Patent [19]

Goldstone et al.

[11] Patent Number: 5,710,675
[45] Date of Patent: Jan. 20, 1998

[54] ANALOG-TO-DIGITAL CONVERTER FOR CONFIGURATION CONTROL

[75] Inventors: Marc B. Goldstone, Irvine; Kenneth D. Donner, Laguna Niguel; Ralph A. Proud, Jr., Mission Viejo, all of Calif.

[73] Assignee: Western Digital Corporation, Irvine, Calif.

[21] Appl. No.: 657,447

[22] Filed: May 29, 1996

[51] Int. Cl.$^6$ ................................................ G11B 15/18
[52] U.S. Cl. ................................................ 360/69; 360/55
[58] Field of Search ...................... 369/124, 32; 360/69, 360/132, 78.02, 78.04, 55, 77

[56] References Cited

U.S. PATENT DOCUMENTS

| | | | |
|---|---|---|---|
| 3,460,032 | 8/1969 | Bement et al. | 324/60 |
| 4,134,079 | 1/1979 | Kohtani | 330/281 |
| 4,841,458 | 6/1989 | Levine et al. | 364/557 |
| 5,201,865 | 4/1993 | Kuehn | 128/419 |
| 5,357,191 | 10/1994 | Grace | 324/754 |
| 5,416,438 | 5/1995 | Shibata | 327/552 |
| 5,434,721 | 7/1995 | Sawada et al. | 360/69 |

*Primary Examiner*—Nabil Hindi
*Attorney, Agent, or Firm*—Leo J. Young; Milad G. Shara

[57] ABSTRACT

A disk drive circuit that includes a configuration resistor, a reference resistor, a capacitor and a processor. The processor is mounted on a first circuit assembly in the disk drive, such as the controller circuit board, and the configuration resistor is mounted on a second circuit assembly, such as the head-disk assembly (I-IDA). The resistance of the configuration resistor corresponds to the configuration of the second circuit assembly. The configuration may represent the number of heads or the type of preamplifier in the IDA. The processor calculates the resistance of the configuration resistor to determine the configuration of the second circuit assembly in the following manner. The processor charges the capacitor. The processor then allows the capacitor to discharge through a first circuit that includes both the configuration resistor and the reference resistor and measures the discharge time or time constant. The processor again charges the capacitor. The processor then allows the capacitor to discharge through a second circuit that includes the configuration resistor but not the reference and measures the time constant. The processor calculates the resistance of the configuration resistor in response to the ratio of the time constants of the first and second circuits.

23 Claims, 3 Drawing Sheets

ANALOG-TO-DIGITAL CONVERTER FOR CONFIGURATION CONTROL

BACKGROUND OF THE INVENTION

1. Field of the Invention

This invention relates generally to electronic devices that read configuration information encoded into their assemblies and alter their operation accordingly and, more specifically, to a disk drive that reads the configuration of its head-disk assembly.

2. Description of the Related Art

Many products include a microprocessor or microcontroller that controls the operation of an electronic or electromechanical device. A manufacturer may produce several similar products that differ only in the device that is controlled. The microprocessor may need to operate differently depending on the differences in the devices that are controlled. For example, a disk drive for computer data storage has a microprocessor that controls the operation of magnetic read/write heads and an electromechanical actuator that moves the heads across the disk. A manufacturer may produce several disk drives that differ only in the number of heads and disks. Nevertheless, the microprocessor must control the read/write heads and the actuator in a manner that allows it to read and write data at any location on any of the disks. For example, the microprocessor software for a disk drive product having one disk and two heads may be somewhat different from that of a disk drive product having three disks and six heads, even though the disk drives are otherwise identical. Also, for example, the microprocessor software for a disk drive product may be somewhat different from that of disk drive products having different channel gain requirements, even though the disk drives are otherwise identical.

Although the manufacturer could program the microprocessor of each product in a manner that is unique to that product, practitioners in the art have developed a more economical solution that takes advantage of the similarities between the products to reduce the total number of different parts. The microprocessor and other electronics are typically on a controller circuit board assembly that is separate from the head/disk assembly on which the disks, heads and associated preamplifier circuits are located. A cable or other connector carries signals between the two assemblies. The head/disk assembly may include a resistor that is electrically connected to the controller assembly via a conductor in the cable. The resistor is included in head/disk assemblies having a first number of heads and disks, but the resistor is omitted from head/disk assemblies having a second number of heads and disks. Each time the disk drive begins operation, the microprocessor reads a signal received from the resistor via the cable and thereby determines whether the resistor is present or absent. The microprocessor then uses the result of this determination as an input to the software that controls the reading and writing processes.

The disk drive configuration system described above allows a manufacturer to produce a single type of controller assembly that may be used in several disk drive products. A disadvantage of this configuration system is that it can only detect one of two configurations. Manufacturers may produce disk drives having any number of disks from one to ten or more, and may have to accommodate the added variables introduced by different head characteristics.

It is known to use a microprocessor to calculate the value of a resistor. U.S. Pat. No. 4,841,458 describes a system in which a microprocessor of an electronic thermostat detects the resistance of a thermistor to determine the temperature. The system includes the thermistor in a circuit with a capacitor and a precision reference resistor. The microprocessor measures the time constant or discharge time of the capacitor through the reference resistor as well as the time constant or discharge time of the capacitor through the thermistor. The microprocessor calculates the ratio of these discharge times, which is proportional to the ratio of the resistances of the thermistor and the reference resistor. The microprocessor then uses the value of the reference resistor to calculate the resistance of the thermistor, which is proportional to the temperature.

It would be desirable to provide a configuration system that allows a microprocessor on a first circuit assembly to detect which of a predetermined number of possible configurations a second circuit assembly has. These problems and deficiencies are clearly felt in the art and are solved by this invention in the manner described below.

SUMMARY OF THE INVENTION

This invention is a disk drive circuit that includes a configuration resistor, a reference resistor, a capacitor and a processor. The processor is mounted on a first circuit assembly in the disk drive, and the configuration resistor is mounted on a second circuit assembly. The first and second circuit assemblies may be any structures in the disk drive that are removably connectable to one another via a physical connector, such as a cable or a plug-and-jack arrangement, and that include electronic components mounted on or supported on portions of the structures. The configuration resistor has one of a plurality of predetermined values, each of which corresponds to a possible configuration of the second circuit assembly. The processor calculates the value of the configuration resistor to determine the configuration of the second circuit assembly.

In an exemplary embodiment, the second circuit assembly is a head-disk assembly (HDA) that includes the disks, read/write heads and head preamplifiers. The configuration may represent the number of heads or the type of preamplifier in the HDA. The processor, which may be any suitable disk drive processor, such as a microprocessor, microcontroller or custom integrated circuit, is mounted on a second circuit assembly. Under control of suitable software, the processor charges the capacitor. The processor then allows the capacitor to discharge through a first circuit that includes both the configuration resistor and the reference resistor and measures the discharge time or time constant. The processor again charges the capacitor. The processor then allows the capacitor to discharge through a second circuit that includes the configuration resistor but not the reference and measures the discharge time or time constant. The processor calculates the value of the configuration resistor in response to the time constants of the first and second circuits. The processor can then control the second circuit assembly in accordance with the value of the resistor.

This invention allows the disk drive manufacturer to minimize the number of different software programs that it includes among the various disk drive types it manufactures. For example, a manufacturer that produces a model or type of drive having two heads and another type of drive having four heads but that is otherwise identical may include the same software in both drive types because the processor can determine the number of heads and control the reading and writing processes accordingly. Most importantly, this invention economically measures the value of the configuration resistor more precisely than conventional methods. Thus, this invention can distinguish among a greater number of different configurations. The foregoing, together with other features and advantages of this invention, are more apparent when referring to the following specification, claims, and accompanying drawings.

BRIEF DESCRIPTION OF THE DRAWINGS

For a more complete understanding of this invention, reference is now made to the following detailed description of the embodiments illustrated in the accompanying drawings, wherein.

DESCRIPTION OF PREFERRED EMBODIMENTS

Figure 1:
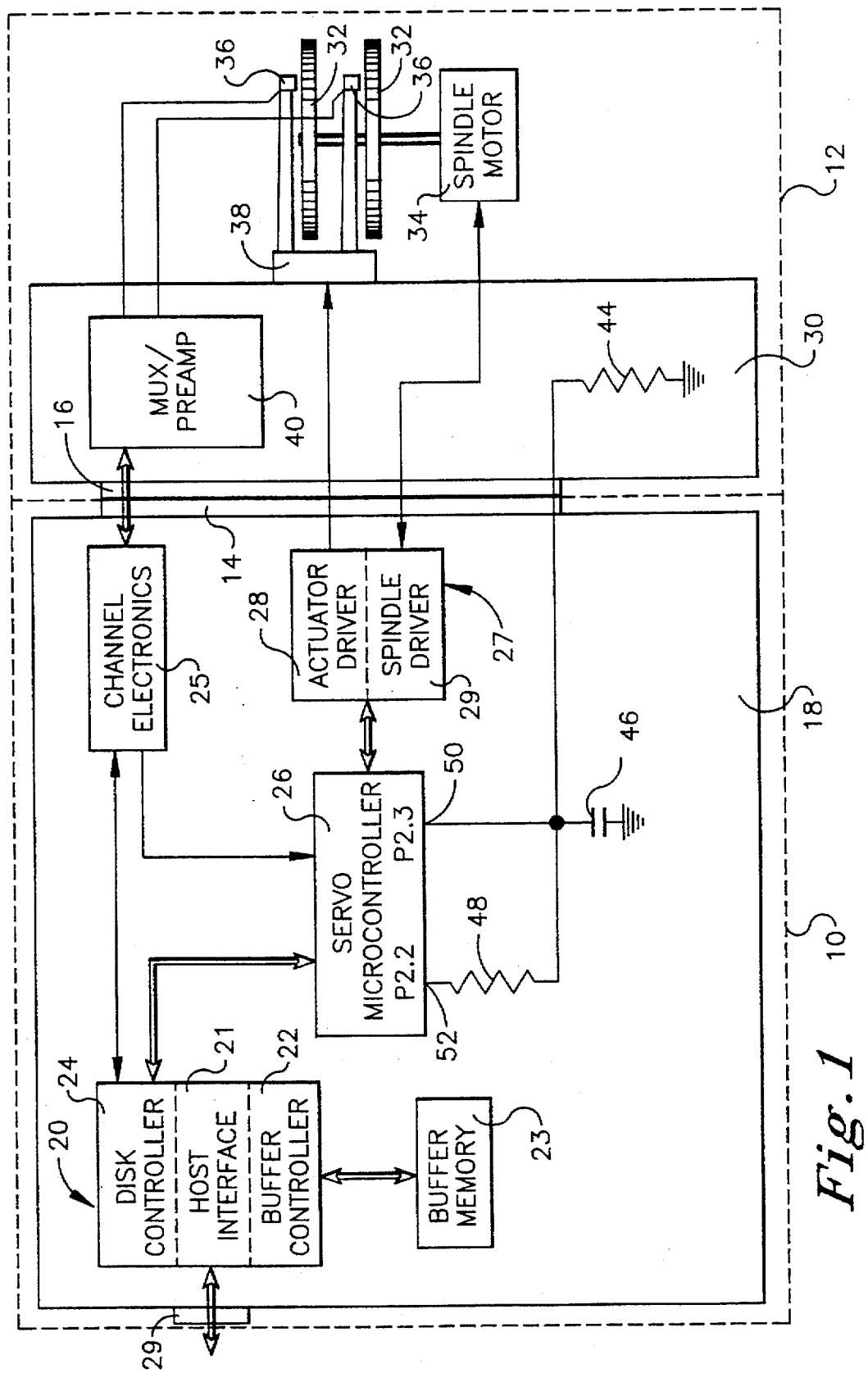
FIG. 1 is a block diagram of a disk drive having a configuration control circuit.
Figure 2:
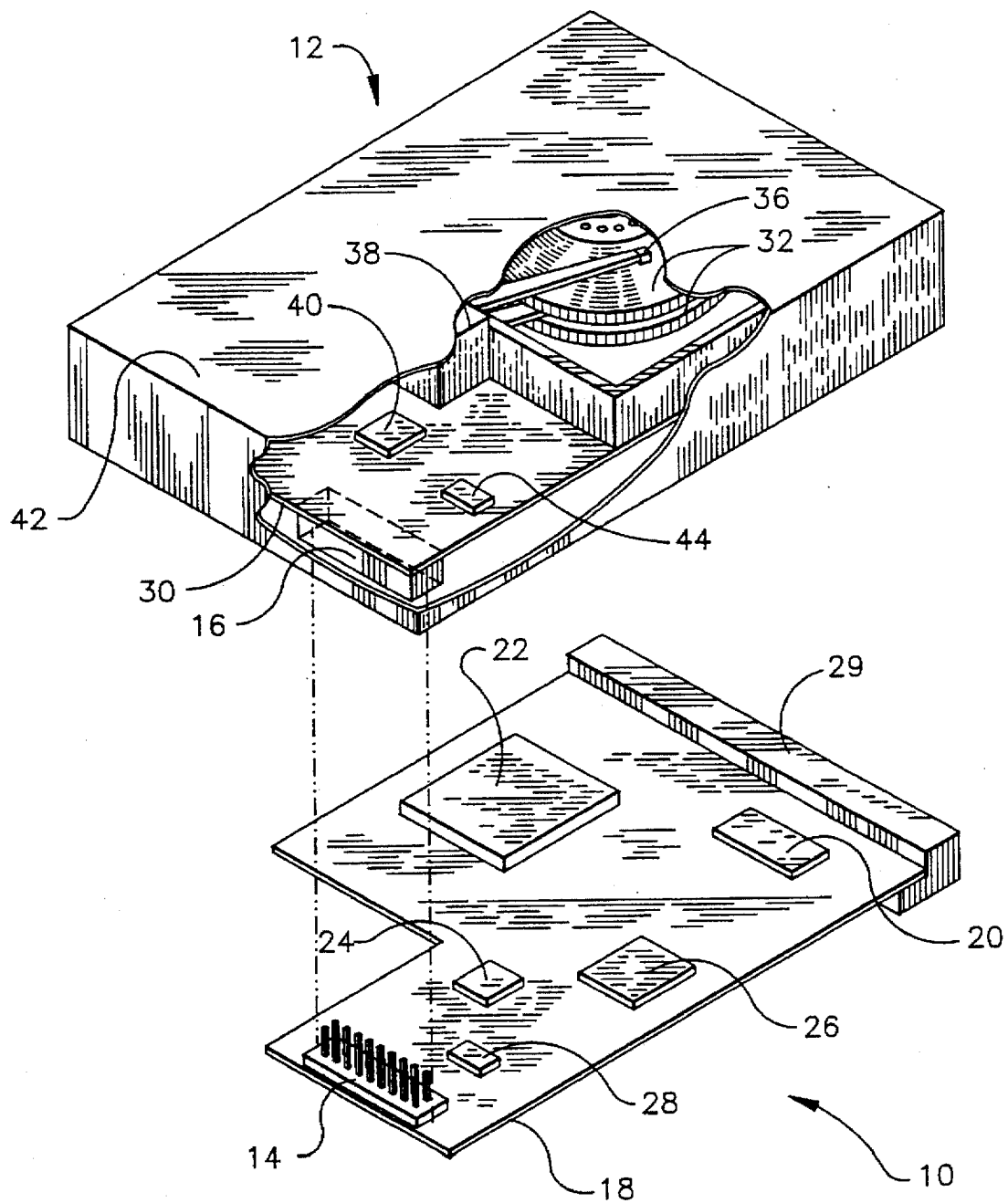
FIG. 2 is a perspective view, partially cut away, of the connection between a head-disk assembly (HDA) and a controller printed circuit board.

As illustrated in FIGS. 1–2, a disk drive includes a controller circuit assembly 10 and a head-disk assembly (HDA) 12. A multi-pin connector 14 on controller circuit assembly 10 is removably connectable to a multi-pin connector 16 on HDA 12.

Controller circuit assembly 10 includes a controller printed circuit board 18 having electronics embodied in suitable components, such as integrated circuits or chips, mounted thereon. The electronics include a controller 20 having a host interface portion 21 for interfacing with a host computer (not shown), a buffer controller portion 22 for buffering data received from the host computer or the HDA in a buffer memory 23, and a disk controller portion 24. Controller 20, among other functions, translates a logical disk drive storage address received from the host computer into a physical disk drive storage address. The electronics further include channel electronics 25, a microcontroller 26, and a combination actuator/spindle driver 27, which includes an actuator driver 28 and a spindle motor driver 29. Microcontroller 26 is preferably a suitable single-chip microcontroller having non-volatile program memory and at least one input/output (I/O) port with programmable input/output states. Microcontroller 26 may, for example, be an Intel 80C 196NU or an IBM MC 19622. A multi-pin host connector 29 connects controller 20 to the host computer.

HDA 12 includes a flexible HDA printed circuit 30, magnetically recordable disks 32, a spindle motor 34 for rotating disks 32, read/write heads 36, and an actuator motor 38 for moving heads 36 across disks 32. A multiplexer (MUX)/preamplifier 40 mounted on flexible HDA printed circuit 30 communicates signals between heads 36 and channel electronics 25. MUX/preamplifier 40 has a number of internal preamplifiers (not shown) equal to the number of heads 36. Although two disks 32 and two heads 36 are shown for illustrative purposes, HDA 12 may have any number of disks and heads commonly included in disk drives. As illustrated in FIG. 2, the components of HDA 12 are sealed within an enclosure 42 in the conventional manner.

HDA 12 also includes a configuration resistor 44 mounted on flexible HDA printed circuit 30. Configuration resistor 44 is preferably a precision resistor, i.e., a resistor having a tolerance of one percent. One terminal of configuration resistor 44 is grounded, and the other is connected to connector 16. Configuration resistor 44 preferably has a value that corresponds to the number of heads 36 included in HDA 12. Using exemplary values in accordance with the software listing of the Appendix hereto, a resistance of 8.25 kilohms may correspond to two heads, 5.90 kilohms may correspond to three heads, an open circuit (very high resistance) to four heads, 14.0 kilohms to five heads, and 11.0 kilohms to six heads. Nevertheless, the value of configuration resistor 44 may correspond to other configuration information, such as the gain characteristics of MUX/preamplifier 40. As described below in further detail, microcontroller 26 determines the value of configuration resistor 44 and uses it to control the reading and writing of data on disks 32.

Controller circuit assembly 10 also includes a capacitor 46, a reference resistor 48, and a current limiting resistor 49 mounted on controller printed circuit board 18. Although reference resistor 48 is preferably a precision resistor, capacitor 46 need not be a precision component because the effect of its resistance on the time constants of the circuits cancels out of the calculation. A suitable value for capacitor 46 is 0.033 microfarads. A suitable value for reference resistor 48 is 10 kilohms. A first terminal of capacitor 46 is grounded, and a second terminal is connected to configuration resistor 44 via connectors 14 and 16. The second terminal of capacitor 46 is also connected to a first terminal of current limiting resistor 49 and to a first terminal of reference resistor 48. The second terminal of current limiting resistor 49 is connected to a first port 50 of microcontroller 26. The second terminal of reference resistor 48 is connected to a second port 52 of microcontroller 26.

Figure 3:
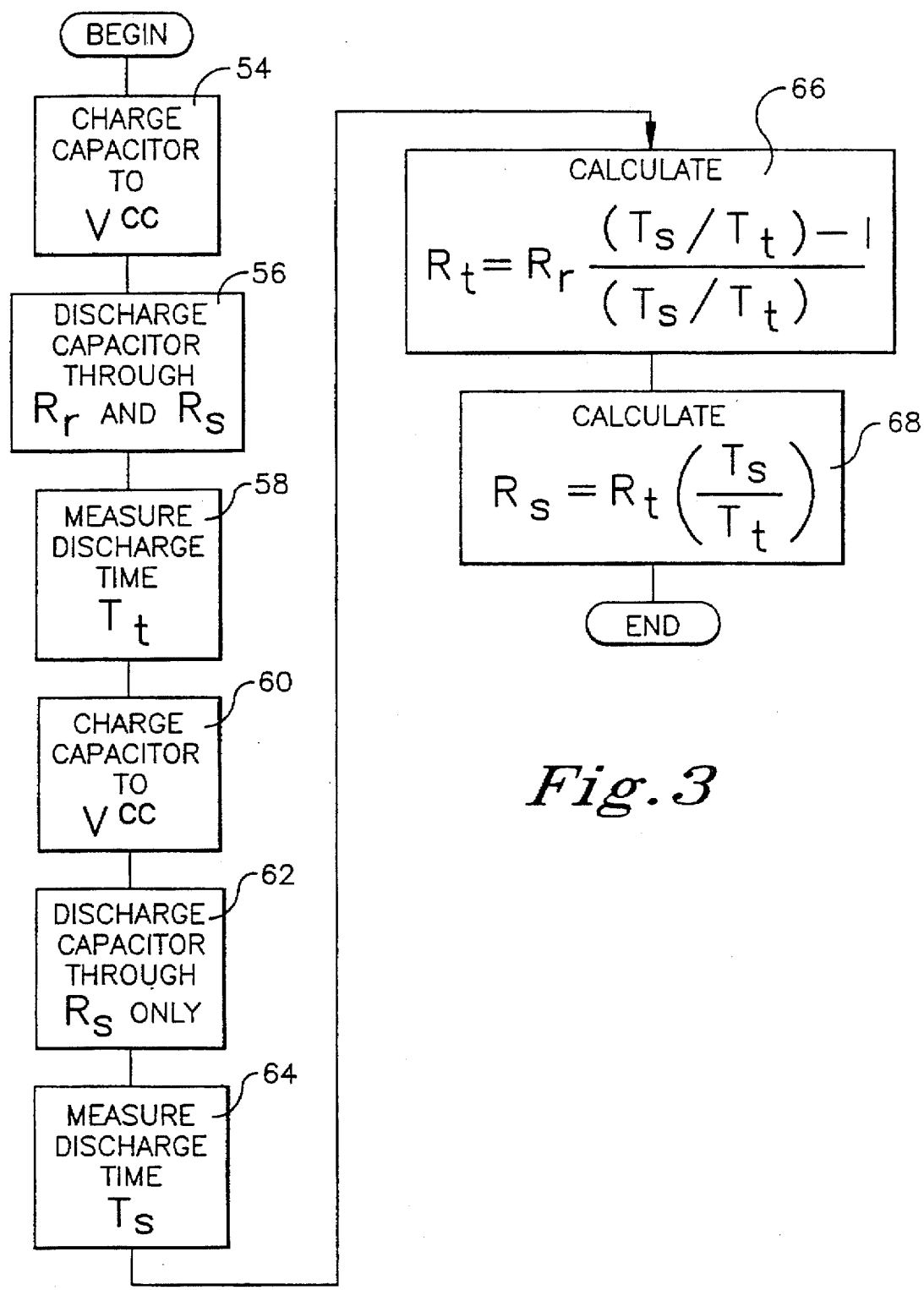
FIG. 3 is a flow diagram illustrating the method of this invention.

Microcontroller 26 determines the value of configuration resistor 44 in accordance with the method illustrated in FIG. 3A–B. In accordance with this method, microcontroller 26, which may be a 80C 196NU or MC 19622, is programmed with the software provided in the Appendix hereto. In the software listing, first and second ports 50 and 52 of microcontroller 26 are ports P2.3 and P2.2, respectively. Nevertheless, in view of the teachings herein, persons of skill in the art are readily able to make and use this invention using any other suitable microcontroller, microprocessor or similar programmable device known in the art.

At step 54 microcontroller 26 saves the flag, timer and port-2 configurations and disables all interrupts. At step 56 microcontroller 26 sets the timer resolution. At step 58 microcontroller 26 initializes variables. At step 60 microcontroller 26 configures the port-2 mode register for input/output (I/O) mode.

Microcontroller 26 first determines whether configuration resistor 44 is present at all, because one of the possible predetermined configurations is the absence of configuration resistor 44. This configuration is preferably that which is expected to be most common, thereby minimizing the total number of configuration resistors 44 that a manufacturer uses. At step 62 microcontroller 26 sets first port 50 to an output configuration and second port 52 to an input or high-impedance (hi-z) configuration. At step 64 microcontroller 26 writes a high logic level, i.e., essentially the supply voltage (VCC) to first port 50. At step 66 microcontroller 26 delays a number of microseconds to allow capacitor 46 to charge to VCC. At step 68 microcontroller 26 sets first port 50 to an input (hi-z) configuration. At step 70 microcontroller 26 initializes a timer. At step 72 microcontroller 26 reads the timer and, at step 74, determines whether the resistance is greater than a predetermined timeout value. If no timeout occurred, at step 76 microcontroller 26 reads first port 50 and determines if it is at a low logic level, i.e., essentially zero volts. The time interval for the voltage of capacitor 46 to transition from a high logic level to a low logic level is the discharge time or time constant of the circuit. If first port 50 is not at a low logic level, microcontroller 26 returns to step 72.

A timeout occurs if configuration resistor 44 is absent because the resistance is so high that no appreciable current can flow. If microcontroller 25 determines at step 74 that a timeout occurred, microcontroller 26 proceeds to step 78. At step 78 microcontroller 26 restores the flag, timer and port configurations. At step 80 microcontroller 26 selects from a predetermined set a configuration that corresponds to the absence of configuration resistor 44. For example, the corresponding configuration may represent that HDA 12 has three heads 36. The number "3" is stored in memory as a variable and made accessible to controller 20 for use in properly routing data between it and heads 36. Microcontroller 26 may also use the configuration for internal purposes, such as adjusting servo parameters. Thus, for example, at step 82 microcontroller 26 adjusts servo head stagger variables in response to the number of heads 36. Microcontroller 26 then returns software execution to the software (not shown) that called the configuration method described herein.

If no timeout occurred, microcontroller 26 proceeds to determine the value of configuration resistor 44. At step 84 microcontroller 26 sets first port 50 to an input (hi-z) configuration. At step 86 microcontroller 26 writes a high logic level to first port 50. At step 88 microcontroller 26 delays a number of microseconds to allow capacitor 46 to charge to VCC. At step 90 microcontroller 26 sets first port 50 to an input configuration (hi-z). At step 92 microcontroller 26 initializes a timer. At step 94 microcontroller 26 reads first port 50 and determines if it is at a low logic level. Microcontroller 26 loops on step 94 until first port 50 reaches a low logic level and then proceeds to step 96. At step 96 microcontroller 26 reads the timer. At step 98 microcontroller 26 subtracts a predetermined value from the timer reading to compensate for the delay inherent in the execution by microcontroller 26 of the program instructions in the timing loop. The resulting value is the discharge time of capacitor 46, $T_s$, through a circuit including configuration resistor 44 but not including reference resistor 48.

Microcontroller 26 then measures the discharge time through a circuit including the parallel combination of configuration resistor 44 and reference resistor 48. At step 100 microcontroller 26 writes a high logic level to first port 50. At step 102 microcontroller 26 delays a number of microseconds to allow capacitor 46 to charge to VCC. At step 104 microcontroller 26 sets first port 50 to an input (hi-z) configuration. At step 105 microcontroller 26 initializes a timer. At step 106 microcontroller 26 writes a low logic level to second port 52, thereby allowing capacitor 46 to discharge through the parallel combination of configuration resistor 44 and reference resistor 48. At step 108 microcontroller 26 reads first port 50 and determines if it is at a low logic level. Microcontroller 26 loops on step 108 until first port 50 reaches a low logic level and then proceeds to step 110. At step 110 microcontroller 26 reads the timer. At step 112 microcontroller 26 subtracts a predetermined value from the timer to compensate for program instruction execution delays in the timing loop. The resulting value is the discharge time of capacitor 46, $T_t$, through a circuit including configuration resistor 44 in parallel with reference resistor 48.

Steps 54–112 should be performed as close in time as possible to one another to minimize error introduced by ambient temperature fluctuations.

Microcontroller 26 then calculates the resistance, $R_s$, of configuration resistor 44 in response to the ratio of the discharge time, $T_t$ to the discharge time, $T_s$. Using this ratio rather than an actual discharge time in the calculation cancels the error that would otherwise be introduced by tolerance variations in the value of capacitor 46. Thus, the value of configuration resistor 44 may be calculated very precisely regardless of the precision with which the value of capacitor 46 is known. The calculation relies on the approximation:

$$T_s \times R_t = R_s \times T_t, \qquad \text{[Eqn. 1]}$$

where $R_t$ is the resistance of the parallel combination of $R_s$ and $R_r$. Solving for $R_s$ yields:

$$R_s = R_t \times \left( \frac{T_s}{T_t} \right) \qquad \text{[Eqn. 2]}$$

The parallel combination of $R_s$ and $R_r$ may be expressed as shown in Eqn. 3:

$$R_t = \frac{R_r \times R_t \left( \frac{T_s}{T_t} \right)}{R_r + R_t \left( \frac{T_s}{T_t} \right)} \qquad \text{[Eqn. 3]}$$

Substituting Eqn. 2 for $R_s$ in Eqn. 3 yields Eqn. 4:

$$R_t = \frac{(R_r \times R_s)}{R_r + R_s} \qquad \text{[Eqn. 4]}$$

Eqn. 4 can be rewritten as:

$$R_t \left( R_r + R_t \left( \frac{T_s}{T_t} \right) \right) = R_r \times R_t \left( \frac{T_s}{T_t} \right) \qquad \text{[Eqn. 5]}$$

Dividing both sides of Eqn. 5 by $R_t$ and moving $R_r$ to the other side of the equation yields:

$$R_t \left( \frac{T_s}{T_t} \right) = R_r \left( \frac{T_s}{T_t} \right) - R_r \qquad \text{[Eqn. 6]}$$

Dividing both sides of Eqn. 6 by $R_r$ and solving for $R_t$ yields:

$$R_t = R_r \times \frac{\left( \frac{T_s}{T_t} \right) - 1}{\left( \frac{T_s}{T_t} \right)} \qquad \text{[Eqn. 7]}$$

Combining Eqn. 7 with Eqn. 2 yields:

$$R_s = R_r \frac{(T_s - T_t)}{T_t} \qquad \text{[Eqn. 8]}$$

At step 114 microcontroller 26 solves Eqn. 8 for $R_s$. The calculation may use floating-point arithmetic if microcontroller 26 has that capability, but double-word integer arithmetic, as shown in the code listing in the Appendix, is also suitable.

Because noise or other unknown factors may offset the resulting measured resistance, $R_s$, from the resistance that is predicted from a circuit in which the value of configuration resistor 44 is known precisely, the measured resistance may be adjusted by this offset. The offset can be determined empirically by performing the steps of the above-described method and comparing the differences between the measured values and the predicted values. At step 116, microcontroller 26 adjusts the measured value by adding (or subtracting) this predetermined offset. Microcontroller 26 then proceeds to steps 78, 80 and 82, which are described above. Microcontroller 26 then returns software execution to the software (not shown) that called the configuration method described herein.

The above-described method for determining the configuration of HDA 12 may be performed at any time, such as each time the disk drive is initialized after powering-up. Microcontroller 26 or controller 20 may use the configuration information in any suitable manner to modify data storage operations accordingly.

As described above, the configuration may represent the number of heads 36 and disks 32 that are present in the drive. Because microcontroller 26 can determine the number of heads 36 and disks 32, microcontroller 26 can position heads 36 at the proper locations or physical addresses on disks 32 to read and write data. In accordance with this invention, controller 20 can receive the number of heads 36 and disks 32 from microcontroller 26. In a manner well-known in the art, controller 20 calculates the physical address in response to a logical address received from the host computer and in response to the number of heads 36 and disks 32.

Although in the embodiment described above, the configuration represents the number of heads 36 and disks 32 in HDA 12, in other embodiments the configuration may represent other parameters of HDA 12. For example, the configuration may represent the channel gain characteristics of MUX/preamplifier 40. Although MUX/preamplifiers produced by different manufacturers may have a common structure or architecture, their gain characteristics may be somewhat different. Controller 20 may transmit a digital gain value to channel electronics 25 to compensate for the channel gain characteristics of the type of MUX/preamplifier 40 in the disk drive.

Clearly, other embodiments and modifications of this invention may occur readily to those of ordinary skill in the art in view of these teachings. Therefore, this invention is to be limited only by the following claims, which include all such other embodiments and modifications when viewed in conjunction with the above specification and accompanying drawings.

APPENDIX
Copyright 1995 Western Digital Corporation

```
;******************************************************************************    *
;*                                                                                  *
;* Routine:     Size line code -      Detect HDA_NumHead and                        *
;*              HDA_Type                                                            *
;*                                                                                  *
;* Return:      HdaNumHed             /* Number of heads of HDA           */        *
;*              HdaType               /* HDA Type                         */        *
;*                                                                                  *
;* This must be called from within servo/spindle code, or                           *
;* through the SvmCommand interface. Never call it                                  *
;* directly from controller f/w.                                                    *
;*                                                                                  *
;******************************************************************************    *

SvpSize:
                pushf                               ; Save di-ei PSW flag state
                di                                  ; Interrupts would mess up
                                                    ; measurement
; "A/D equivalent" for obtaining drive size using an R/C delay
; circuit.
; Rflex = 10,000 * (T1 - T2) / T2, T1 = Rflex only,
; T2 = 10K || Rflex
; Port2.3 charges the cap through 100 ohms, or is hi-z monitor
; w/threshold
; Port2.2 discharges the cap through 10K, or is hi-z for no
; effect.
RefRes          equ     10000                       ; Reference resistor in ohms
; Save Port2 setup until done with this size procedure
; It was already initialized by the controller f/w, so we will
; put it back later exactly as it was.
                ldb     AL, P2REG
                ldb     AH, T1_CON
                st      AX, W0                      ; Temp calib var
                ldb     AL, P2MODE
                ldb     AH, P2DIR
                st      AX, W2                      ; Temp calib var
; Use highest allowed resolution of Timer1 or measurement
; comes out low
T1Pre2          equ     01                          ; T1: prescale (x2 state
                                                    ; times /4 /2)
                ldb     AL, #CEm+UDm+(T1Mode shl 3)+T1Pre2
                stb     AL, T1_CON
; Init variables which are a record of hardware based results
                st      Sfr0, Ts
                st      Sfr0, Tt
; Start measurements
                ldb     AL, P2MODE                  ;
                andb    AL, #not M3+M2              ; Make sure these 2 are I/O
                                                    ; lines, not special
                stb     AL, P2MODE                  ; function lines
                ldb     AL, P2DIR
                andb    AL, #not M3                 ; Set Port2.3 = output
```

-continued

APPENDIX
Copyright 1995 Western Digital Corporation

```
                orb     AL, #M2                                     ; 0=output
                                                                    ; Set Port2.2 = input
                stb     AL, P2DIR                                   ; 1=input
; First check for open circuit, then repeat discharge if not
; an open circuit.
; Have to do it twice to 1) avoid using interrupts and 2)
; avoid adding extra instructions to discharge wait loop which
; would cause measurement error.
                ldb     AL, P2REG                                   ; Set Port2.3 high,
                                                                    ; charge cap
                orb     AL, #M3+M2                                  ; Set Port2.2 high or it
                                                                    ; won't be a hi-z
                stb     AL, P2REG                                   ; input (it's open-drain)
                ld      AX, #Dly50uS*2                              ; Delay at least 50 uSec
                djnzw   AX, $                                       ; to charge the capacitor
                ld      AX, uPIntMsk                                ; Prevent meas. blown by
                                                                    ; servo ints
                or      AX, #uPSvIntMskM+uPSpIntMskM                ; Disable spin &
                                                                    ; actuator ints
                st      AX, uPIntMsk
                ldb     AL, P2DIR
                orb     AL, #M3                                     ; Change Port2.3 to
                                                                    ; input (hi-z)
                stb     AL, P2DIR
; First measure done w/Port2.2 at hi z (input) and
; Port2.3 at hi-z (input), without ref. resistor in parallel
                st      Sfr0, TIMER1                                ; Init timer 1 to zero
; Wait for discharging cap to cross input port pin = zero
; threshold
Size20:         ld      CX, TIMER1                                  ; Check for waiting
                                                                    ; forever = check
                cmp     CX, #40000                                  ; for open-ckt, 24 mS @ 40
                                                                    ; MHz
                bh      Size80                                      ; Jump = Is open-circuit,
                                                                    ; timed out
                ldb     AL, P2PIN                                   ; Port2.3 value
                jbs     AL, 3, Size20                               ; Loop until Port input goes
                                                                    ; low
; Not open-circuit, repeat test to measure resistor accurately
                ldb     AL, P2DIR
                andb    AL, #not M3                                 ; Set Port2.3 = output
                                                                    ; 0=output
                orb     AL, #M2                                     ; Set Port2.2 = input
                                                                    ; 1=input
                stb     AL, P2DIR
                ldb     AL, P2REG                                   ; Set Port2.3 high,
                                                                    ; charge cap
                orb     AL, #M3+M2                                  ; Set Port2.2 high or it
                                                                    ; won't be a hi-z
                stb     AL, P2REG                                   ; input (it's open-drain)
                ld      AX, #Dly50uS*2                              ; Delay at least 50 uSec
                djnzw   AX, $                                       ; to charge the capacitor
                ldb     AL, P2DIR
                orb     AL, #M3                                     ; Change Port2.3 to
                                                                    ; input (hi-z)
                stb     AL, P2DIR
; First measure done w/Port2.2 at hi Z (input) and
; Port2.3 at hi-z (input), without ref. resistor in parallel
                st      Sfr0, TIMER1                                ; Init timer 1 to zero
; Wait for discharging cap to cross input port pin = zero
; threshold
Size30:         ldb     AL, P2PIN                                   ; Port2.3 value
                jbs     AL, 3, Size30                               ; Loop until Port input
                                                                    ; goes low
                ld      AX, TIMER1                                  ; Immediately read present
                                                                    ; Timer1
; f/w loop latency error: Min 3+5+7=15, Max 3+9+10+5+7=34, avg
; = 25 states
                sub     AX, #3                                      ; (.05uS*25)/2 = 0.625uS = 3
                                                                    ; T1 cnts
                st      AX, Ts                                      ; Elapsed time w/o ref
                                                                    ; resistor
                ldb     AL, P2DIR
                andb    AL, #not M3                                 ; Make Port2.3 high first to
                stb     AL, P2DIR                                   ; charge the cap again
; 2nd measure will be done w/Port2.2 low and Port2.3
```

APPENDIX
Copyright 1995 Western Digital Corporation

```
; hi-Z (input) with ref. resistor in parallel
            ld      AX, #Dly50uS*2          ; Delay at least 50 usecs
            djnzw   AX, $                   ; to charge the capacitor
            ldb     AL, P2DIR
            orb     AL, #M3                 ; Setup Port2.3 as input
            stb     AL, P2DIR               ; Port2.2
            st      Sfr0, TIMER1            ; Init timer 1 to zero
            ClrPortIO P2, AL, M2            ; Port2.2 open-drain low
                                            ; to place ref resistor in
                                            ; parallel
Size70:     ldb     AL, P2PIN               ; Port2.3 value
            jbs     AL, 3, Size70           ; Loop until Port input
                                            ; goes low
            ld      AX, TIMER1              ; Immediately read present
                                            ; Timer1
; f/w loop latency error: Min 3+5+7=15, Max 3+9+10+5+7=34,
; avg = 25 states
            sub     AX, #3                  ; (.05uS*25)/2 = 0.625uS = 3
                                            ; T1 cnts
            st      AX, Tt                  ; Elapsed time w/ref resistor
; Use simple double word integer precision for normalization
            ld      AX, Ts
            sub     AX, Tt                  ; Low word
            clr     BX                      ; Hi word
            shll    AX, #15                 ; Normalize for precision
            divu    AX, Tt                  ; AX = ratio of elapsed times
            ld      DX, #RefRes
            mulu    CX, DX, AX              ; CX = unknown resistance
; De-normalize the result
            shrl    CX, #15                 ; Scale back down to ohms x1
Size80:     st      CX, Rs                  ; Rs = Flex resistor resistance,
ohms
            sub     CX, #22                 ; Compensate for
                                            ; meas. error
            st      CX, Rsa                 ; Rs adjusted by compensation
                                            ; value
; Restore Port2 bits 2,3 to previous setup by the
; controller f/w.
            ld      AX, W0
            stb     AL, P2REG               ; Temp calib var
            stb     AH, T1_CON
            ld      AX, W2                  ; Temp calib var
            stb     AL, P2MODE
            stb     AH, P2DIR
            popf                            ; Restore di-ei PSW flag \
                                            ; state
; Compare resistance in CX with the table of resistances for
; different options
            ld      EX, #-1
            ldbze   BX, #Cpage
            xld     AX, #SizeResTable
TblLkUp:
            inc     EX
            eld     DX, [AX]+               ; Compare against resistor
                                            ; value tbl
            cmp     CX, DX
            jh      TblLkUp                 ; Measured is higher,
                                            ; try again
; EX contains number based on reading of HDA configuration
; resistor, number is 0-5
            xld     AX, #SizeHeadTable      ; BX still has CPage
            add     AX, EX                  ; Adjust with offset
            eldb    DX, [AX]                ; Get number of heads
            stb     DX, HdaNumHed
            stb     DX, NumHed              ; Drive size in number of
                                            ; heads
            xld     AX, #SizeHDATypeTable   ; BX still has Cpage
            add     AX, EX
            eldb    DX, [AX]
            stb     DX, HdaType             ; Save HDA type
if not SwBankWrt
            xld     AX, #TblHedTmr6         ; Select the 6 head, 4
                                            ; head, or 2 head
if SwStagr6on4
            sjmp    Size_HedTmr             ; STW used 6 head stagger
                                            ; on 4 head HDA
endif
```

-continued

APPENDIX
Copyright 1995 Western Digital Corporation

|  |  |  |  |
|---|---|---|---|
| | cmpb | NumHed, #5 | ; servowriter head |
| | | | ; stagger table per |
| | jge | Size_HedTmr | ; the number of heads |
| | xld | AX, #TblHedTmr4 | |
| | cmpb | NumHed, #3 | |
| | jge | Size_HedTmr | |
| | xld | AX, #TblHedTmr2 | |
| Size_HedTmr: | | | |
| | st | AX, AddrTblHedTmr | ; Put tbl addr in D4 Dram |
| | | | ; servo window |
| | st | BX, AddrTblHedTmr2 | ; BX still has CPage |
| endif | | | |
| | ret | | |
| ; Tables for SvpSize | | | |
| SizeResTable: | | | ; Option # |
| | dcw ( 5900+ 8250)/2 | | ; Below this is |
| | | | ; 5.90K ohms = 0 |
| | dcw ( 8250+ 9090)/2 | | ; Below this is |
| | | | ; 8.25K ohms = 1 |
| | dcw ( 9090+10000)/2 | | ; Below this is |
| | | | ; 9.09K ohms = 2 |
| | dcw (10000+11000)/2 | | ; Below this is |
| | | | ; 10.0K ohms = 3 |
| | dcw (11000+14000)/2 | | ; Below this is |
| | | | ; 11.0K ohms = 4 |
| | dcw 20000 | | ; Below this is |
| | | | ; 14.0K ohms = 5 |
| | dcw 65535 | | ; Maximum, for |
| | | | ; open circuit = 6 |
| SizeHeadTable: | | | |
| | dcb 3 | ; A1B | ; 5.90K |
| | dcb 2 | ; A1A A1B | ; 8.25K |
| | dcb 3 | ; A1A | ; 9.09K |
| | dcb 5 | ; A1A | ; 10.0K |
| | dcb 6 | ; A1A A1B | ; 11.0K |
| | dcb 5 | ; A1A A1B | ; 14.0K |
| | dcb 4 | ; A1A A1B | ; open |
| SizeHDATypeTable: | | | |
| | dcb | 1 | |
| | dcb | 1 | |
| | dcb | 1 | |
| | dcb | 1 | |
| | dcb | 1 | |
| | dcb | 1 | |
| | dcb | 1 | |
| ; End of SvpSize | | | |

We claim:

1. In a disk drive having a first circuit assembly and a second circuit assembly, wherein the first circuit assembly includes a microprocessor and the second assembly has a configuration, a configuration apparatus for indicating the configuration of the second circuit assembly, comprising:

a configuration resistor in the second circuit assembly having a resistance $R_s$ corresponding to one of a plurality of predetermined disk drive configurations;

a connector electrically coupling said configuration resistor to the first circuit assembly;

a reference resistor in the first circuit assembly having a predetermined resistance $R_r$;

a capacitor in the first circuit assembly;

microprocessor charging means for charging said capacitor;

microprocessor discharging means for selectably discharging said capacitor through either a first R—C circuit coupled to the microprocessor having a resistance $R_t$ including both said configuration resistor and said reference resistor or a second R—C circuit coupled to the microprocessor having a resistance including said configuration resistor and not including said reference resistor;

microprocessor measuring means for measuring a discharge time $T_t$ of said capacitor through said first R—C circuit and for measuring a discharge time $T_s$ of said capacitor through said second R—C circuit;

microprocessor calculating means for calculating the resistance $PR_s$ of said configuration resistor in response to the discharge time $T_t$ and the discharge time $T_s$; and microprocessor configuration means for selecting the one of the plurality of predetermined disk drive configurations corresponding to the resistance $R_s$.

2. The configuration apparatus recited in claim 1, wherein said microprocessor calculating means calculates the resistance $R_s$ in accordance with the equation $T_s R_t = T_t R_s$.

3. The configuration apparatus recited in claim 1, wherein said configuration resistor and said reference resistor are connected in parallel in said circuit having a resistance including both said configuration resistor and said reference resistor.

4. The configuration apparatus recited in claim 1, wherein each configuration represents a predetermined number of heads in the disk drive.

5. The configuration apparatus recited in claim 1, wherein each configuration represents one of a plurality of predetermined types of preamplifier circuits.

6. The configuration apparatus recited in claim 1, wherein:

a first terminal of said reference resistor is connected to a first port of the microprocessor;

a first terminal of said configuration resistor is connected to a first terminal of said capacitor, to a second terminal of said reference resistor and to a second port of the microprocessor;

a second terminal of said configuration resistor is connected to electrical ground; and a second terminal of said capacitor is connected to electrical ground.

7. The configuration apparatus recited in claim 1, wherein:

said microprocessor discharging means provides a signal at a first port of the microprocessor;

said microprocessor charging means provides a signal at a second port of the microprocessor; and said microprocessor measuring means receives a signal at the second port of the microprocessor.

8. A disk drive including a head-disk assembly (HDA) having at least one data storage disk and a controller assembly having a microprocessor, comprising:

microprocessor read/write means in the controller assembly for controlling data transfers on the data storage disk;

a configuration resistor in the HDA having a resistance R, corresponding to one of a plurality of predetermined HDA configurations;

a first connector half on the controller assembly;

a second connector half on the HDA connectable to said first connector half for electrically coupling said configuration resistor to the controller assembly;

a reference resistor in the controller assembly having a predetermined resistance $R_r$;

a capacitor in the controller assembly;

microprocessor charging means for charging said capacitor;

microprocessor discharging means for selectably discharging said capacitor through either a first R—C circuit coupled to the microprocessor having a resistance $R_t$ including both said configuration resistor and said reference resistor or a second R—C circuit coupled to the microprocessor having a resistance including said configuration resistor and not including said reference resistor;

microprocessor measuring means for measuring a discharge time $T_t$ of said capacitor through said first R—C circuit and for measuring a discharge time $T_s$ of said capacitor through said second R—C circuit;

microprocessor calculating means for calculating the resistance $R_s$ of said configuration resistor in response to the discharge time $T_t$ and the discharge time $T_s$; and microprocessor configuration means for selecting the one of the plurality of predetermined disk drive configurations corresponding to the resistance $R_s$.

9. The disk drive recited in claim 8, wherein said microprocessor calculating means calculates the resistance $R_s$ in accordance with the equation $T_s R_t = T_t R_s$.

10. The disk drive recited in claim 8, wherein said configuration resistor and said reference resistor are connected in parallel in said circuit having a resistance including both said configuration resistor and said reference resistor.

11. The disk drive recited in claim 8, wherein the HDA includes a predetermined number of heads, and the configuration of the HDA represents number of heads in the HDA.

12. The disk drive recited in claim 8, wherein the HDA includes a preamplifier circuit having one a plurality of predetermined types, and the configuration of the HDA represents the type of preamplifier circuit in the HDA.

13. The disk drive recited in claim 8, wherein:

a first terminal of said reference resistor is connected to a first port of the microprocessor;

a first terminal of said configuration resistor is connected to a first terminal of said capacitor, to a second terminal of said reference resistor and to a second port of the microprocessor;

a second terminal of said configuration resistor is connected to electrical ground; and a second terminal of said capacitor is connected to electrical ground.

14. The disk drive recited in claim 8, wherein:

said microprocessor discharging means provides a signal at a first port of the microprocessor;

said microprocessor charging means provides a signal at a second port of the microprocessor; and said microprocessor measuring means receives a signal at the second port of the microprocessor.

15. A configuration apparatus in a disk drive, comprising:

a first printed circuit board having a microprocessor mounted thereon;

a second printed circuit board having one of a plurality of configurations;

a first connector half connected to said first printed circuit board;

a second connector half connected to said second printed circuit board and removably connected to said first connector half;

a configuration resistor on said second printed circuit board having a resistance $R_s$ corresponding to the configuration of the second printed circuit board;

a reference resistor on the first printed circuit board having a predetermined resistance $R_r$;

a capacitor on the first printed circuit board;

microprocessor charging means for charging said capacitor;

microprocessor discharging means for selectably discharging said capacitor through either a first R—C circuit coupled to the microprocessor having a resistance $R_t$ including both said configuration resistor and said reference resistor or a second R—C circuit coupled to the microprocessor having a resistance including said configuration resistor and not including said reference resistor;

microprocessor measuring means for measuring a discharge time $T_t$ of said capacitor through said first R—C circuit and for measuring a discharge time $T_s$ of said capacitor through said second R—C circuit;

microprocessor calculating means for calculating the resistance $R_s$ of said configuration resistor in response to the discharge time $T_t$ and the discharge time $T_s$; and microprocessor configuration means for selecting the one of the plurality of predetermined configurations corresponding to the resistance $R_s$.

16. The configuration apparatus recited in claim 15, wherein said microprocessor calculating means calculates the resistance $R_s$ in accordance with the equation $T_s R_t = T_t R_s$.

17. The configuration apparatus recited in claim 15, wherein said configuration resistor and said reference resistor are connected in parallel in said circuit having a resistance including both said configuration resistor and said reference resistor.

18. The configuration apparatus recited in claim 15, wherein:

a first terminal of said reference resistor is connected to a first port of the microprocessor;

a first terminal of said configuration resistor is connected to a first terminal of said capacitor, to a second terminal of said reference resistor and to a second port of the microprocessor;

a second terminal of said configuration resistor is connected to electrical ground; and a second terminal of said capacitor is connected to electrical ground.

19. The configuration apparatus recited in claim 15, wherein:

said microprocessor discharging means provides a signal at a first port of the microprocessor;

said microprocessor charging means provides a signal at a second port of the microprocessor; and said microprocessor measuring means receives a signal at the second port of the microprocessor.

20. In a disk drive having a first circuit assembly, a second circuit assembly and a connector for electrically coupling the first and second circuit assemblies, wherein the first circuit assembly includes a microprocessor, a reference resistor having a predetermined resistance $R_r$, and a capacitor, and wherein the second circuit assembly has one of a plurality of predetermined disk drive configurations and includes a configuration resistor having a resistance $R_s$ corresponding to the configuration of the second circuit assembly, a method for detecting the configuration of the second circuit assembly, comprising the steps of:

charging the capacitor a first time;

discharging said capacitor through a circuit having a resistance $R_t$ including both the configuration resistor and the reference resistor;

measuring a discharge time $T_t$ of the capacitor;

charging the capacitor a second time;

discharging the capacitor through a circuit having a resistance including the configuration resistor and not including the reference resistor;

measuring a discharge time $T_s$ of the capacitor;

calculating the resistance $R_s$ of the configuration resistor in response to the discharge time $T_t$ and the discharge time $T_s$; and selecting one of the plurality of predetermined disk drive configurations in response to the resistance $R_s$.

21. The method recited in claim 20, wherein said selecting step includes a step of modifying a digital value in the first circuit assembly in response to the selected one of the plurality of predetermined disk drive configurations.

22. The method recited in claim 21, wherein the first circuit assembly modifies a signal coupled to a preamplifier in the second circuit assembly in response to the digital word.

23. The method recited in claim 21, wherein the first circuit assembly includes a controller circuit that translates a logical disk drive storage address into a physical disk drive storage address in response to the digital word.

* * * * *